United States Patent
Fujii et al.

(10) Patent No.: US 6,664,951 B1
(45) Date of Patent: *Dec. 16, 2003

(54) MOBILE COMMUNICATION TERMINAL EQUIPMENT AND TOUCH PANEL SWITCH USED THEREIN

(75) Inventors: Shigeyuki Fujii, Osaka (JP); Tamotsu Yamamoto, Hyogo (JP); Yuichi Yamamoto, Osaka (JP); Koji Tamano, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 505 days.

This patent is subject to a terminal disclaimer.

(21) Appl. No.: 09/612,353

(22) Filed: Jul. 7, 2000

(30) Foreign Application Priority Data

Jul. 7, 1999 (JP) ............................................. 11-192769

(51) Int. Cl.[7] ............................. G09G 5/00; G08C 21/00
(52) U.S. Cl. .................. 345/173; 178/18.01; 178/18.03
(58) Field of Search ................................. 345/156, 157, 345/158, 168, 169, 173, 179; 178/18.01, 18.03, 18.04, 18.05, 18.07, 18.09; 341/22, 23

(56) References Cited

U.S. PATENT DOCUMENTS

| | | | |
|---|---|---|---|
| 4,532,395 A | 7/1985 | Zukowski | 200/314 |
| 4,683,360 A | 7/1987 | Maser | 400/492 |
| 5,388,922 A | 2/1995 | Smiley | 200/314 |
| 5,742,894 A | 4/1998 | Jambhekar et al. | |
| 5,917,906 A | 6/1999 | Thornton | |
| 5,996,080 A | 11/1999 | Silva et al. | |
| 6,243,080 B1 | 6/2001 | Molne | |
| 6,518,958 B1 * | 2/2003 | Miyajima et al. | 345/173 |

FOREIGN PATENT DOCUMENTS

| | | |
|---|---|---|
| EP | 0 913 977 A | 5/1999 |
| JP | 09-083226 A | 3/1997 |
| WO | WO 98/08241 | 2/1998 |

OTHER PUBLICATIONS

European Search Report for EP 00 11 4634 dated Jul. 29, 2003.

* cited by examiner

*Primary Examiner*—Vijay Shankar
(74) *Attorney, Agent, or Firm*—RatnerPrestia

(57) ABSTRACT

Relating to a mobile communication terminal equipment for portable use such as cellular telephone and radiotelephone, it is intended to obtain a constitution capable of selecting a desired item out of plural items promptly, and maintaining an excellent controllability for a long period. A touch panel switch (37) is disposed between a display unit (33) and an operation button block (36) disposed on a same surface of an outer case (31), and by a signal obtained by sliding on the touch panel switch (37) by finger in the horizontal direction to this installation surface, an item in the display unit (33) is selected according to the sliding direction, or a desired item is selected by moving the cursor position, and therefore if there are many items to be selected, a desired item can be selected quickly, and if a slight flaw is formed on the surface of the touch panel switch (37), a favorable controllability is maintained.

13 Claims, 22 Drawing Sheets

PRIOR ART

PRIOR ART

PRIOR ART

MOBILE COMMUNICATION TERMINAL EQUIPMENT AND TOUCH PANEL SWITCH USED THEREIN

FIELD OF THE INVENTION

The present invention relates to a mobile communication terminal equipment for portable use such as cellular telephone and radiotelephone, and a transparent touch panel switch used therein.

BACKGROUND OF THE INVENTION

A conventional mobile communication terminal equipment (hereinafter referred to simply as MCTE) for portable use such as cellular telephone and radiotelephone is explained by referring to the drawings.

FIG. 19 is a front view of a conventional MCTE. As shown in FIG. 19, the front side of the housing, that is, an outer case 1 is the operation panel.

A receiver 2 with a built-in speaker and a display unit 3 are formed in the upper part of this operation panel. The display unit 3 is composed of a liquid crystal device (hereinafter referred to simply as LCD) 4.

On the other hand, in the lower part of the operation panel, a transmitter 5 with a built-in microphone used in transmission and an operation button block 6 comprising numeric and other keys are disposed. One of the keys in this operation button block 6 is a decision key 6a for determining each operation. A transparent touch panel switch (hereinafter referred to simply as TTPS) 7 is disposed between the display unit 3 and operation button block 6.

FIG. 20 is a partial sectional view of the MCTE shown in FIG. 19. The LCD 4 composing the display unit 3 is extended to the display unit 3 and lower part of the TTPS 7.

An antenna 8 is disposed at the upper end of the outer case 1. The antenna 8 is contained in the outer case 1 when not calling, and is drawn out to a specified length when calling. Also in this outer case 1, an electric circuit (not shown in FIG. 19 and FIG. 20) for controlling input and output information is incorporated. The input and output information is transmitted to the LCD 4, operation button block 6, TTPS 7, and antenna 8. FIG. 21 is a block diagram showing the composition of the MCTE including the electric circuit.

As shown in FIG. 21, the LCD 4, operation button block 6, TTPS 7, and antenna 8 are connected to a central processing unit (hereinafter referred to simply as CPU) 9 directly or through a specified circuit. The CPU 9 processes operations, makes judgement, and controls the LCD 4, operation button block 6, TTPS 7, and antenna 8.

That is, the LCD 4 is connected to the CPU 9 through an LCD driver 10, and the TTPS 7, through a transparent touch panel switch driver 11. The signal from the operation button block 6 is directly fed into the CPU 9. The antenna 8 is connected to the CPU 9 through a transmission-reception circuit 12.

Further, a ROM 13 in which specified information is registered preliminarily, and a RAM 14 which can register or delete the telephone number and other information as required are connected to the CPU 9.

FIG. 22 shows the display state of the display unit 3 and TTPS 7 in the initial state of the MCTE not in service. Herein, the initial state is, for example, the state right after turning on the power source of the MCTE.

Referring now to FIG. 21 and FIG. 22, the operation of the MCTE having such configuration is explained. As shown in FIG. 22, the display unit 3 shows a specified initial menu 15 composed of plural items, and a cursor 16 showing which item of the display items is being presently selected. In the portion of the LCD 4 corresponding to the lower position of the TTPS 7, arrows 17 for moving the cursor 16 in a desired direction are shown.

When making a call by using this MCTE, the user first touches the specified area indicated by the arrow 17 of the TTPS 7 by a finger in order to change the display screen from the initial state to a screen for a desired operation. By this touching, the position of the cursor 16 displayed in the display unit 3 is adjusted to a desired item. Then the user pushes the decision key 6a shown in FIG. 19. By this pushing, the selected item is established. The decision signal is sent to the CPU 9.

When recognizing the decision signal, the CPU 9 discriminates the item selected by the cursor 16 of the display unit 3, calls a specified menu screen or the like corresponding to the item from the ROM 13 or RAM 14, and transmits it to the LCD 4 through the LCD driver 10. Then the CPU 9 changes the display message of the LCD 4 including the portion extended to the lower part of the TTPS 7 to the desired one.

The CPU of the conventional MCTE is designed to operate in this manner.

The operation of selecting the item on the display unit 3 is described in detail below. When calling by searching a telephone number registered beforehand, the user operates to change over to the display corresponding to the item "Calling telephone number" from the items of the initial menu 15. The user first touches the specified area indicated by the arrow 17 of the TTPS 7 several times. By this operation, the cursor 16 moves in the specified direction. When the cursor 16 comes to the position of the item "Calling telephone number," the user presses the decision key 6a.

By this operation, the CPU 9 fetches the information of registered telephone directory from the RAM 14 or ROM 13, transmits the information to the LCD 4 through the LCD driver 10, and changes the display of the LCD 4 including the portion extended to the lower part of the TTPS 7 to the telephone directory and the display capable of searching it.

In this state, plural telephone numbers are shown on the display unit 3. In the portion of the LCD 4 in the lower part of the TTPS 7, the arrow is displayed same as above.

In succession, the user touches the specified area of the TTPS 7 same as mentioned above, adjusts the cursor 16 to a desired telephone number, and pushes the decision key 6a. By this operation, the user can select and establish the desired telephone number.

Thus, when the CPU 9 recognizes that the desired telephone number has been established, the CPU 9 controls to transmit the transmission signal corresponding to the searched and established telephone number through the transmission-reception circuit 12 and antenna 8.

At the same time, the CPU 9 controls the receiver 2 and transmitter 5 not shown in the block diagram in FIG. 21 as specified so as to transmit and receive the input and output signal such as voice through the transmission-reception circuit 12 and antenna 8.

Thus, in the conventional MCTE, when searching a desired item from multiple items, it requires many touch operations on the TTPS 7. That is, the user must push the TTPS 7 once every time moving one item. Therefore, the conventional MCTE is poor in operability. Or if the touch operations are repeated for a long period, sag or flaw may be formed on the upper surface of the TTPS 7. In this state, it is difficult for the user to recognize the display message in the LCD 4 disposed in the lower part of the TTPS 7. Therefore, the user experiences difficulty in manipulating the TTPS 7. These are the problems of the conventional MCTE.

SUMMARY OF THE INVENTION

It is hence an object of the invention to present a mobile communication terminal equipment for solving the problems of the prior art and a touch panel switch used therein. The mobile communication terminal equipment and the touch panel switch used therein of the invention are capable of selecting a desired item promptly from the plural items shown in the display unit, and maintaining the excellent controllability for a long period.

The mobile communication terminal equipment of the invention comprises:

a) a display unit showing plural items arranged in a specified pattern, and a cursor indicating the presently selected item, b) an operation button block including numeric and other keys, c) a decision key for establishing the selected specified item, and d) a touch panel switch disposed between the display means and operation button block, e) a position of the items or the cursor in the display unit is moved according to the sliding direction by a signal which is obtained by sliding on touch panel switch, and a desired item is selected by moving the position of the items or the cursor.

DETAILED DESCRIPTION OF THE PREFERRED EMBODIMENTS

An embodiment of the invention is described in detail below while referring to FIG. 1 to FIG. 9.

Embodiment 1

Figure 1:
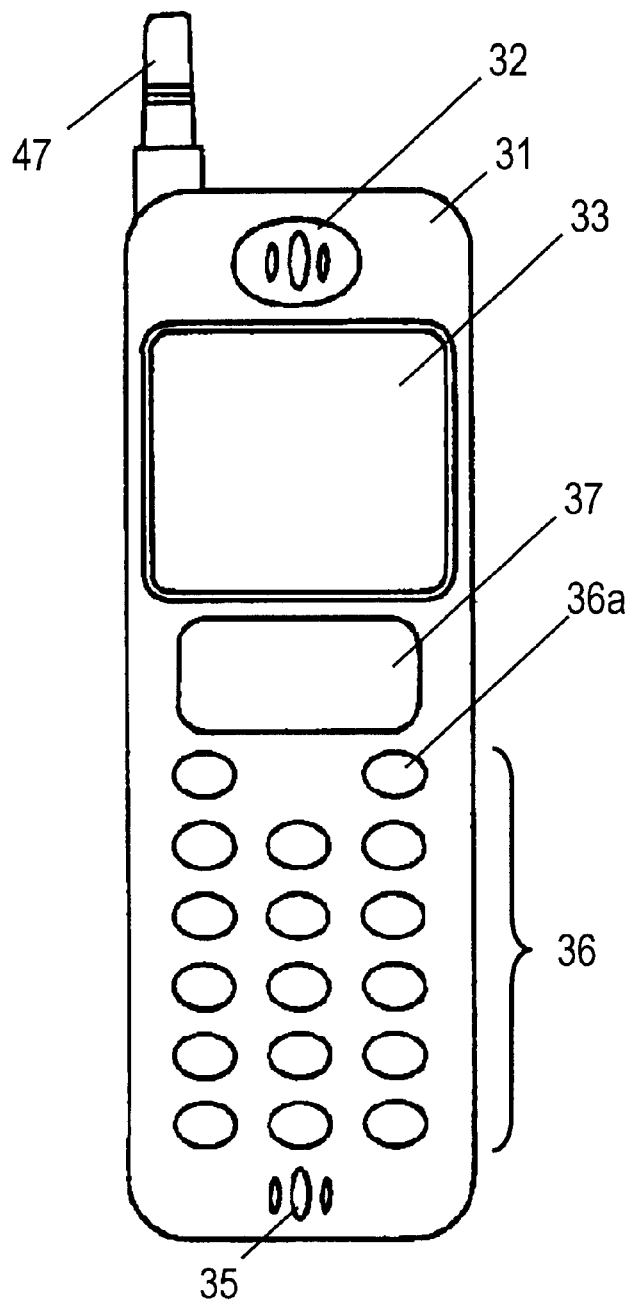
FIG. 1 is a front view of MCTE in a first embodiment of the invention.
Figure 2:
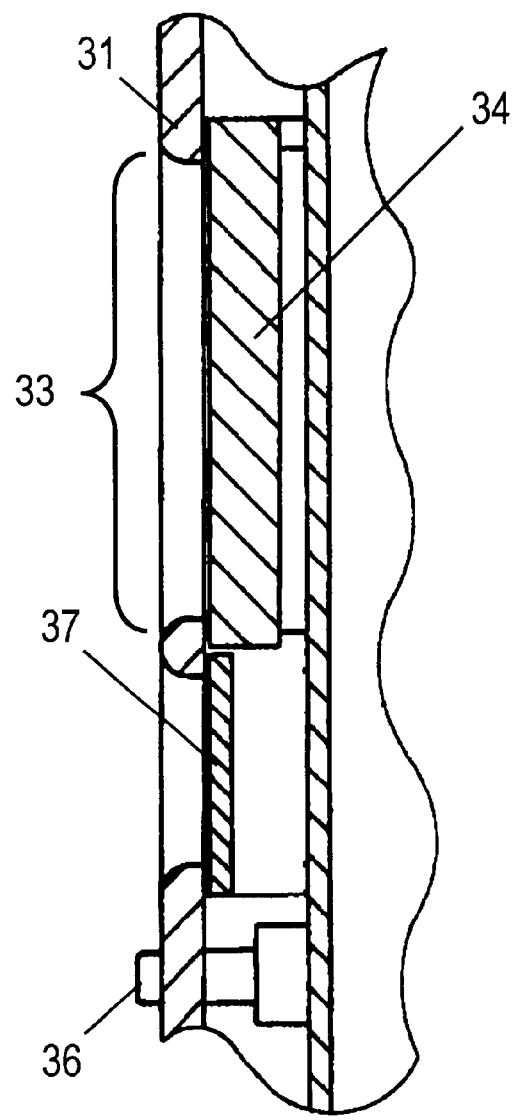
FIG. 2 is a partial sectional view near the location of a touch panel switch composing input selecting means of the MCTE shown in FIG. 1.
Figure 19:
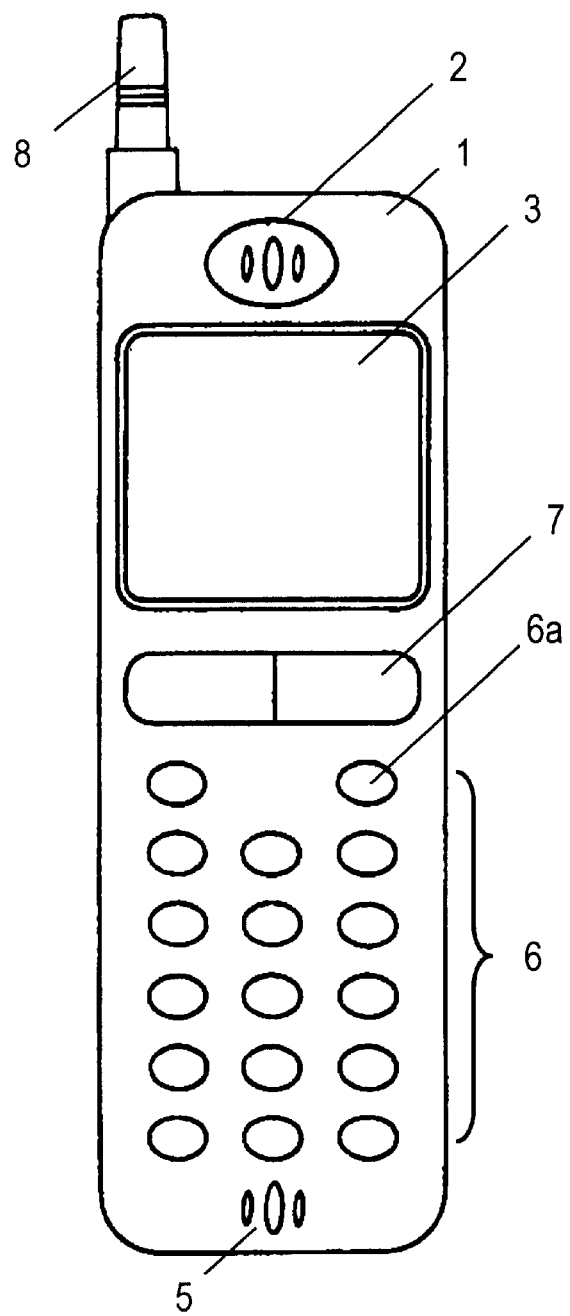
FIG. 19 is a front view of a conventional MCTE.
Figure 20:
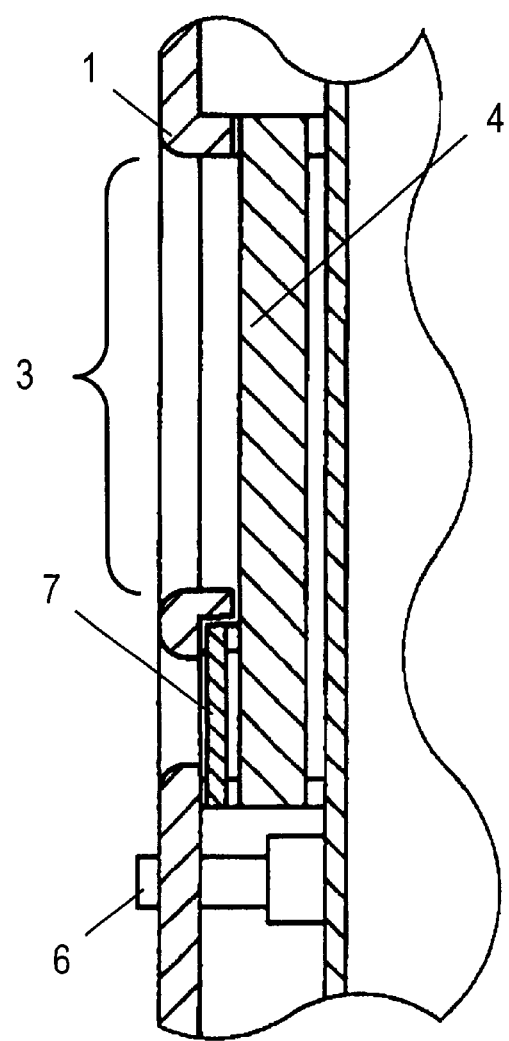
FIG. 20 is a partial sectional view near the display unit of the MCTE shown in FIG. 19.
Figure 21:
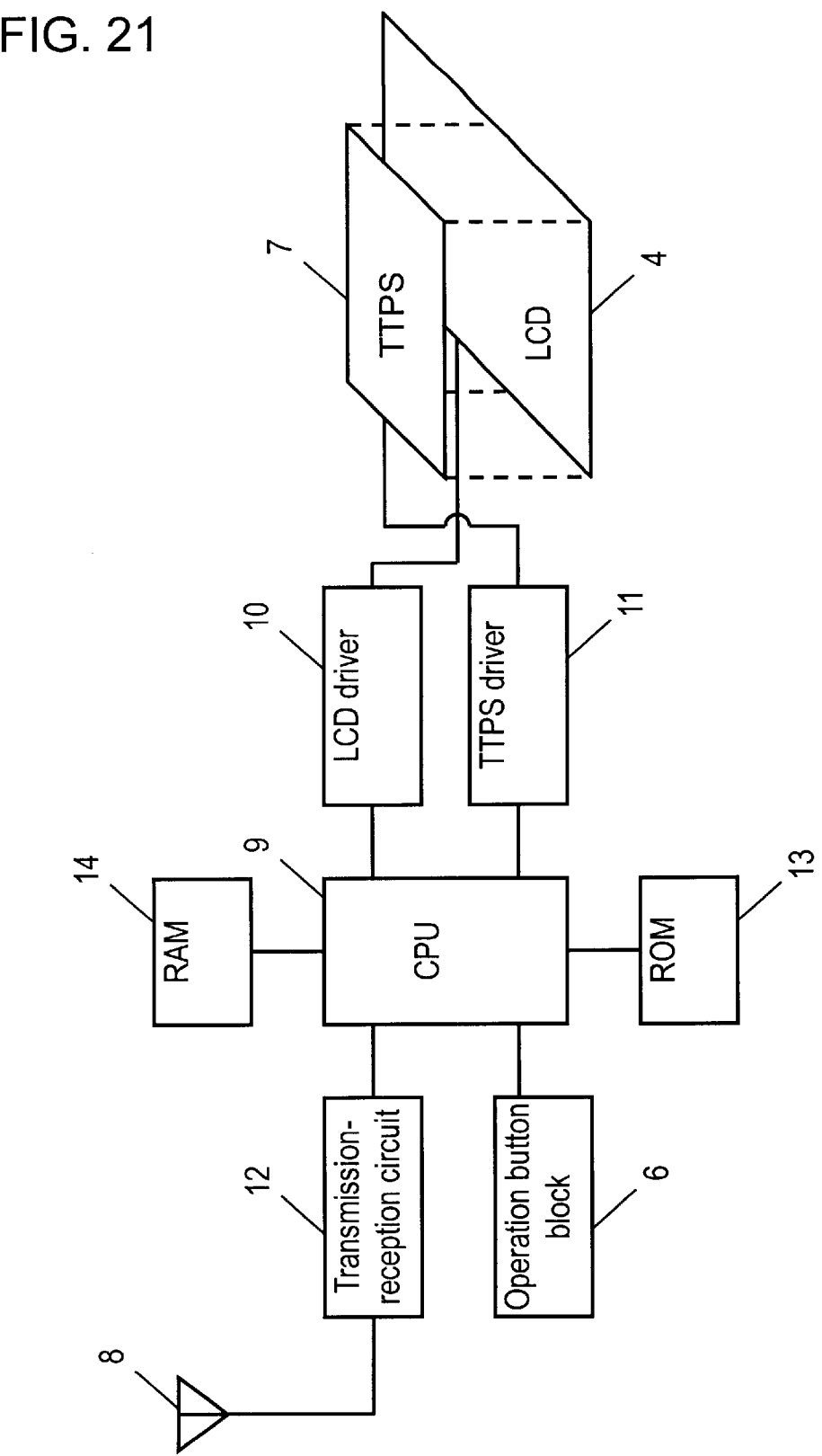
FIG. 21 is a block diagram of the MCTE shown in FIG. 19.
Figure 22:
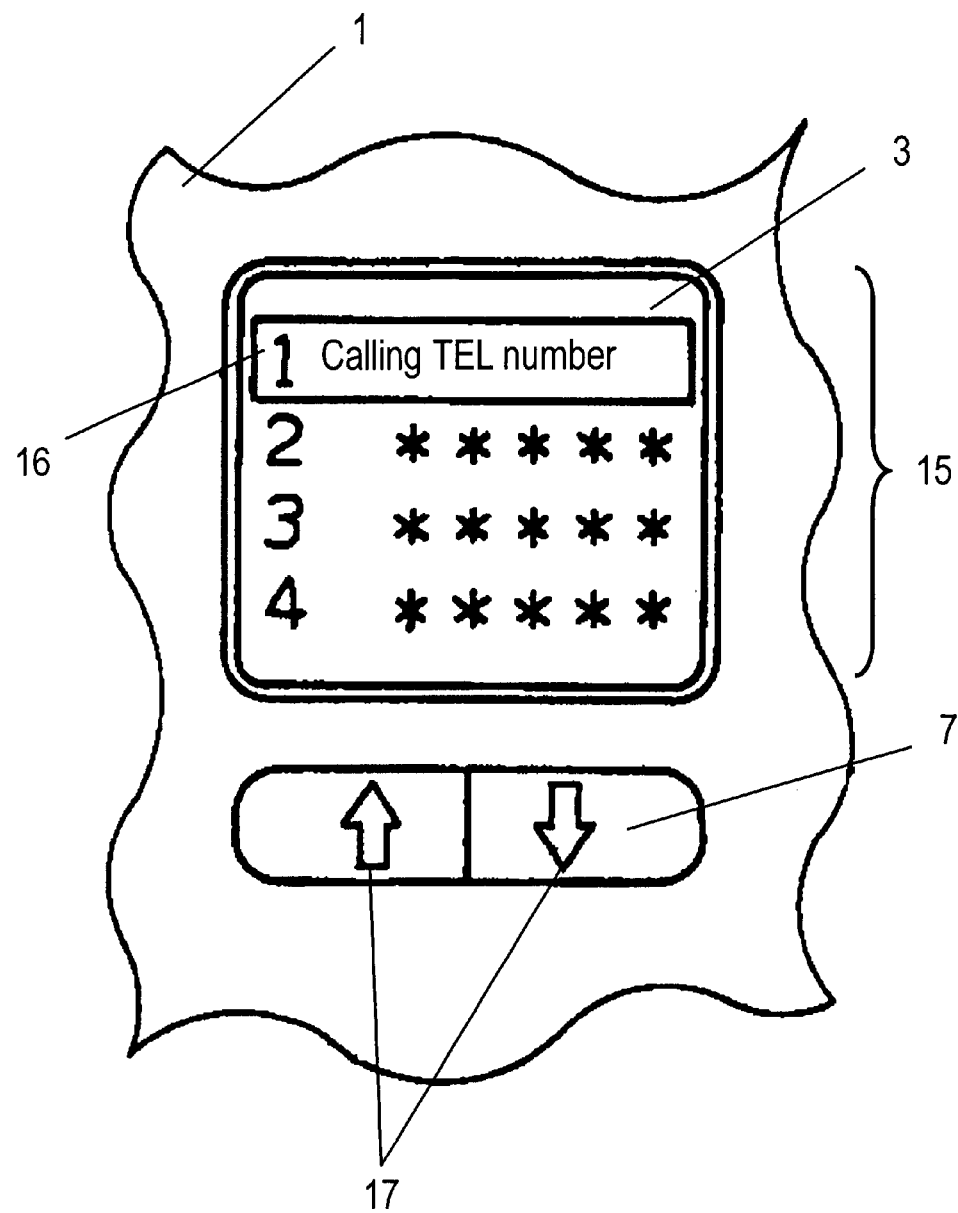
FIG. 22 is a top view near the display unit in an initial state of the MCTE shown in FIG. 19.

FIG. 1 is a front view of MCTE in embodiment 1 of the invention. As shown in FIG. 1, the front surface of an outer case 31 is an operation panel of MCTE. In the upper part of the operation panel, a receiver 32 and a display unit 33 are formed. The display unit 33 is composed of an LCD 34. In the lower part of the operation panel, a transmitter 35 and an operation button block 36 comprising numeric and other keys are disposed. One of the keys in this operation button block 36 is a decision key 36a, and this decision key 36a is for determining the selected specified item. This configuration is same as in the prior art shown in FIG. 19.

The outer case 31 is a rectangular parallelepiped, and is composed of six rectangular sides. The widest surface of the six sides is the operation panel.

The input selecting means, that is, the touch panel switch (hereinafter referred to simply as TPS) 37 is disposed between the display unit 33 and operation button block 36. The layout of the TPS is same as in the prior art shown in FIG. 19. However, as shown in a partial sectional view in FIG. 2, the LCD 34 for composing the display unit 33 is not extended to the lower part of the TPS 37. This point is the difference from the prior art.

The shape of the operation part which is the input selecting means composed of the TPS 37 is nearly rectangular as shown in the front view in FIG. 1. This rectangular shape is smaller in the dimension in the longitudinal direction of the outer case 31, and is set larger in the dimension in the orthogonal width direction.

Figure 3:
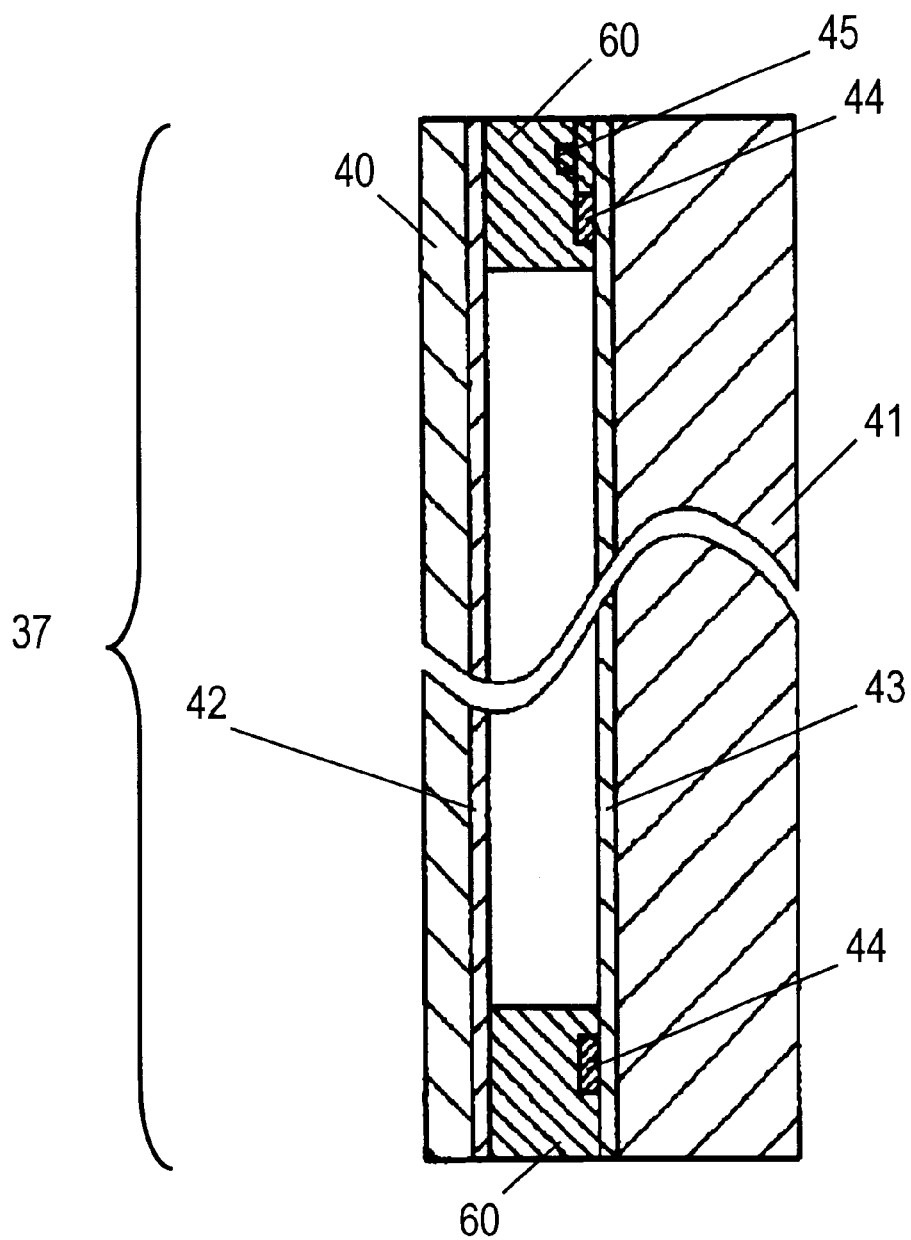
FIG. 3 is a sectional view of the touch panel switch composing the MCTE shown in FIG. 1.

As shown in a sectional view in FIG. 3, the TPS 37 is composed of a flexible upper insulating base material (hereinafter referred to simply as UIBM) 40 forming a conductive film 42 in a specified shape, and a lower insulating base material (hereinafter referred to simply as LIBM) 41 forming a conductive film 43 in a specified shape, and the conductive films 42 and 43 are formed to face each other.

An adhesive layer 60 is to hold the conductive films 42 and 43 at a specific spacing so as to keep in an insulated state. This configuration is generally called the analog type or resistance film type. In the TPS 37 of this system, by pushing down the specified position of the UIBM 40, the conductive films 42 and 43 conduct with each other. By this conduction, a specified output signal is obtained from the TPS 37 of this system.

Figure 4:
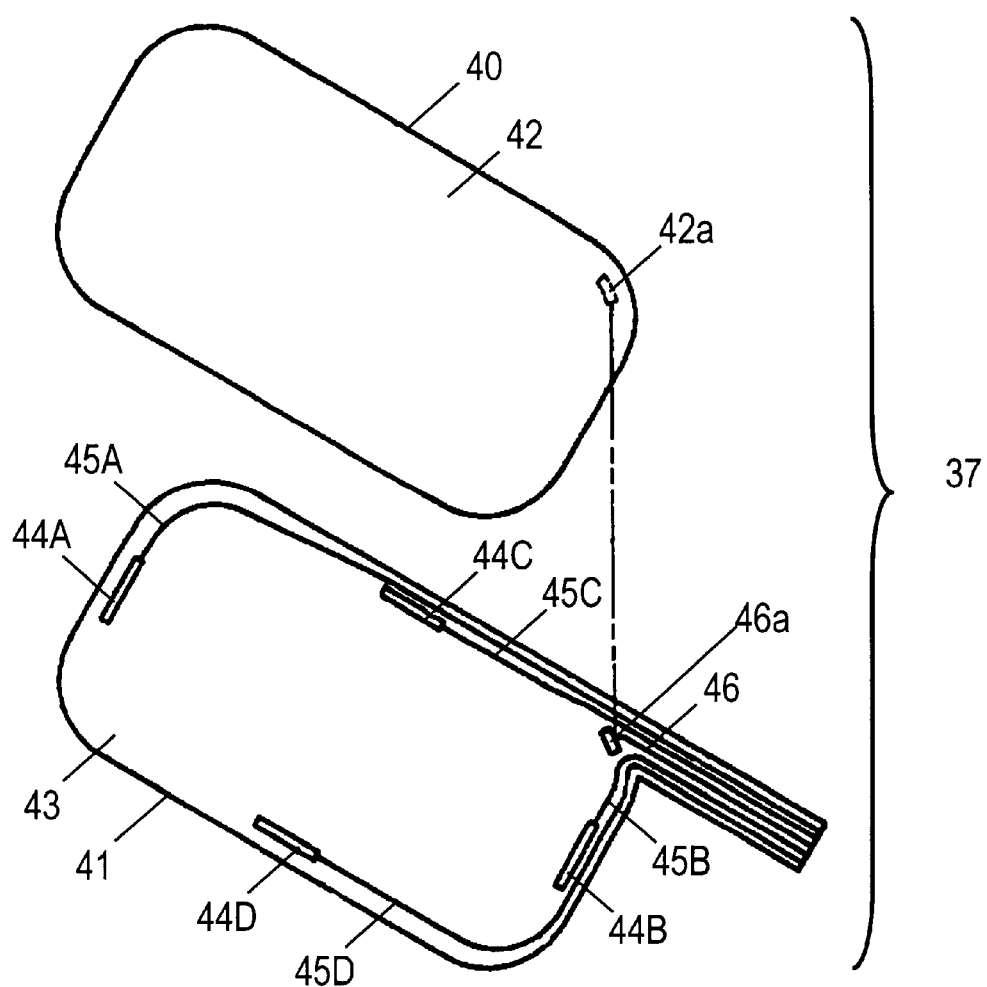
FIG. 4 is a perspective exploded view of the touch panel switch composing the MCTE shown in FIG. 1.

The construction is specifically described by referring to a perspective exploded view in FIG. 4. As shown in FIG. 4, in the center of each side of the conductive film 43 of the LIBM 41, electrodes 44A, 44B, 44C, 44D are formed in a state electrically connected to the conductive film 43. The length of each electrode is formed shorter than the length of each side of the conductive film 43. Being electrically connected to each one of these four electrodes (44A, 44B, 44C, 44D), derivation parts (45A, 45B, 45C, 45D) in a state electrically insulated from the conductive film 43 are drawn out to outside. A derivation part 46 electrically connected to the conductive film 42 of the UIBM 40 is also provided on the LIBM 41, and drawn out to outside. A leading end 46a of the derivation part 46 is electrically connected to a derivation part 42a of the conductive film 42. However, the derivation part 46 and its leading end 46a are electrically insulated from the conductive film 43.

In this configuration, the conductive film 42 of the UIBM 40 can be used as a mere contacting device (a switch). Therefore, the area resistance value of the conductive film 42 is not required to be homogeneous. That is, the conductive film 42 is not required to have a high linearity precision or the like. Hence, the TPS 37 can be manufactured at low cost. Besides, as compared with the electrodes of the ordinary touch panel, the length of the electrodes (44A, 44B, 44C, 44D) is shorter. It is therefore easy to form the outer form in other than quadrangular form, for example, an elliptical form. Hence the touch panel switch of the embodiment may be reduced in size and weight.

In this TPS 37, the sides of the operation panel and the corresponding electrodes are disposed in the outer case 31 so as to be parallel to each other. The central portion enclosed by the four electrodes (44A, 44B, 44C, 44D) is the operation part.

Figure 5:
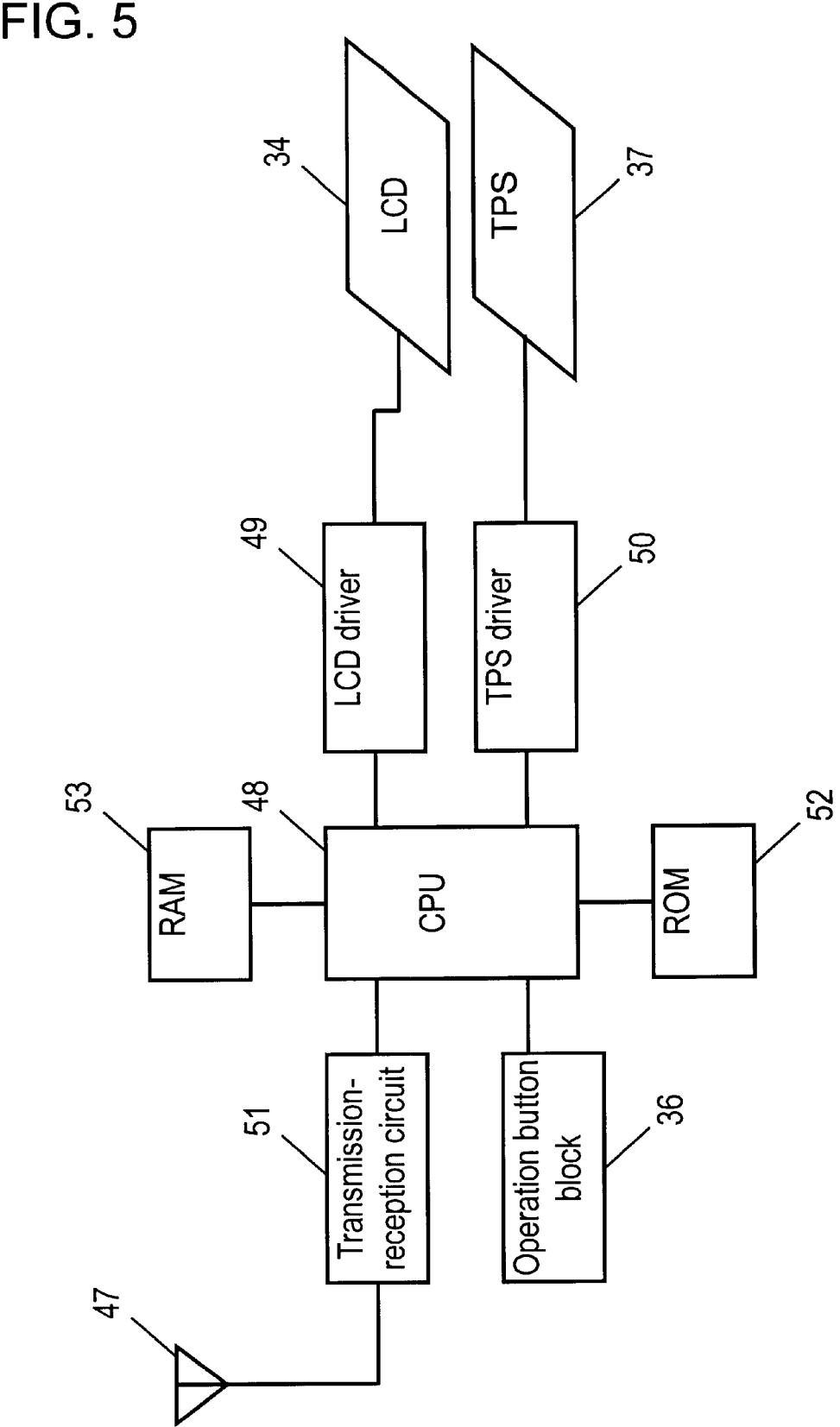
FIG. 5 is a block diagram of the MCTE shown in FIG. 1.

An antenna 47 is disposed in the upper part of the outer case 31. The antenna 47 is contained in the outer case 31 when not calling, and is drawn out to a specified length when calling. Also in this outer case 31, an electric circuit (not shown in FIG. 1 and FIG. 2) for controlling input and output information is incorporated. The input and output information is transmitted to the display unit 33, operation button block 36, TPS 37, and antenna 47. FIG. 5 is a block diagram showing the composition of the MCTE including the electric circuit.

As shown in FIG. 5, the LCD 34 which is the display unit 33, operation button block 36, TPS 37, and antenna 47 are connected to a CPU 48 directly or through a specified circuit. The CPU 48 processes operations, makes judgement, and controls the LCD 34 which is the display unit 33, operation button block 36, TPS 37, and antenna 47.

That is, the LCD 34, which is the display unit 33, is connected to the CPU 48 through an LCD driver 49. The signal from the operation button block 36 is directly fed into the CPU 48.

The TPS 37 is connected to the CPU 48 through a touch panel switch driver 50. This is same as in the prior art. However, the method of operation of the TPS 37 in this embodiment is different from the method of the prior art. The output is also different from that in the prior art. The CPU 48 has a function of processing the output of the TPS 37. These points are described later.

The antenna 47 is also connected to the CPU 48 through a transmission-reception circuit 51. Further, a ROM 52 in which specified information is registered preliminarily, and a RAM 53 which can register or delete the telephone number and other information as required are connected to the CPU 48.

Figure 6:
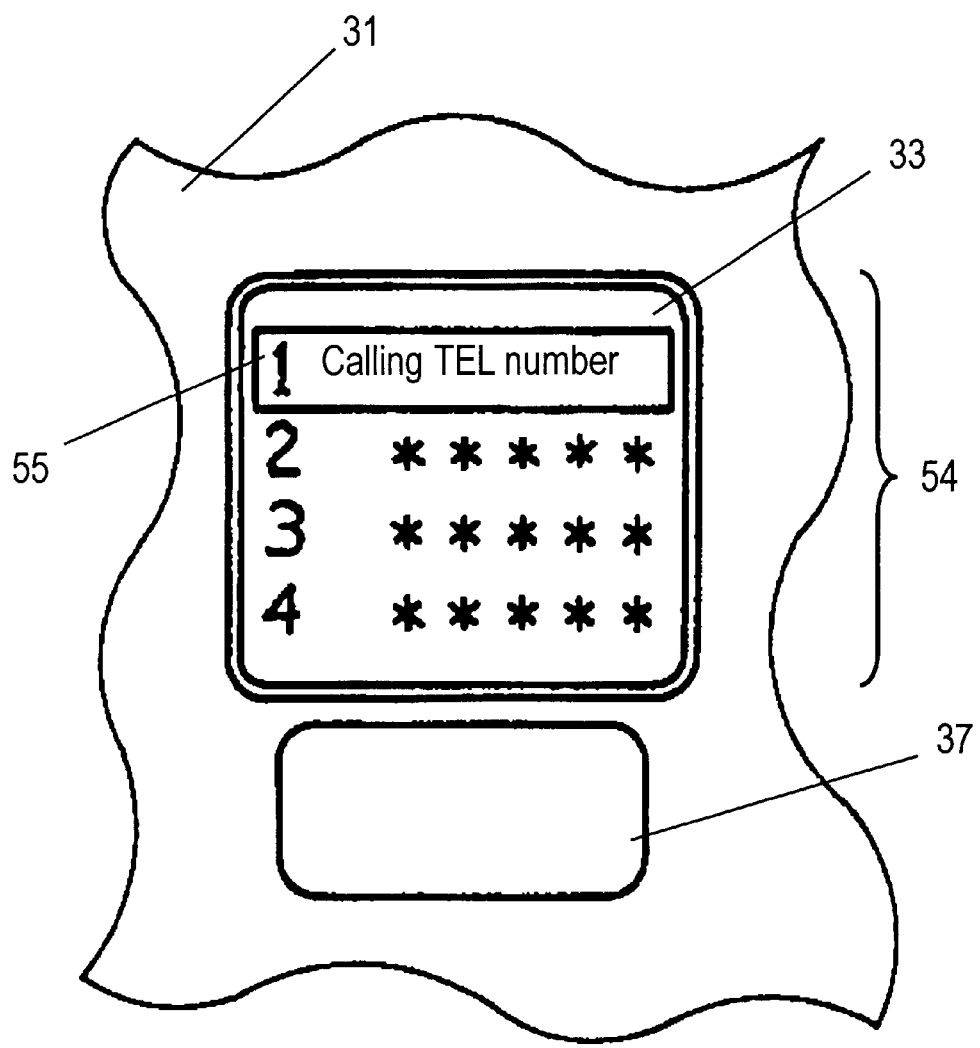
FIG. 6 is a top view near the display unit in an initial state of the MCTE shown in FIG. 1.

FIG. 6 shows the display state of the display unit 33 in the initial state of the MCTE not in service. Herein, the initial state is, for example, the state right after turning on the power source of the MCTE.

Referring now to FIG. 5 and FIG. 6, the operation of the MCTE of the embodiment is explained.

In the MCTE of the embodiment, in the initial state neither transmitting nor receiving, as shown in FIG. 6, the display unit 33 shows a specified initial menu 54 and a cursor 55. The initial menu 54 is composed of plural items. The cursor 55 shows that item of the display items of the specified initial menu 54 is being presently selected. This state is same as in the prior art. However, nothing is displayed in the TPS 37 disposed as input selecting means.

When making a call by using this MCTE, the user first changes the display screen from the initial state to a screen for making a desired operation. To change over, the user moves the cursor 55 shown on the display unit 33 in a desired direction by sliding by finger on the surface of the TPS 37 (see FIG. 7).

The TPS 37 is composed the conductive films 42 and 43 formed on the confronting sides of the UIBM 40 and LIBM 41 held at a specific spacing as mentioned above. The UIBM 40 is flexible. Accordingly, by sliding on the surface of the UIBM 40, the contact position of the conductive films 42 and 43 changes sequentially. As a result, the voltage between each electrode and derivation part 46 varies. This voltage change is used as a signal in the MCTE of the embodiment. When a specific voltage is applied between the electrodes 44A and 44B, the voltage between the electrode 44B and derivation part 46 is a voltage depending on the contact position of the conductive films 42 and 43. Similarly, when a specific voltage is applied between the electrodes 44C and 44D, the voltage between the electrode 44D and derivation part 46 is a voltage depending on the contact position of the conductive films 42 and 43. Thus, from the mutually orthogonal direction of the TPS 37, a voltage depending on the contact position of the conductive films 42 and 43 can be taken out.

Application of voltage between the electrodes 44A and 44B, and application of voltage between the electrodes 44C and 44D are realized by changing over one power source alternately at specified time intervals. By this operation, from the mutually orthogonal direction of the TPS 37, a voltage depending on the contact position of the conductive films 42 and 43 can be taken out. Also, the voltage between the electrode 44A and derivation part 46, or the voltage between the electrode 44C and derivation part 46 may be used similarly.

The touch panel switch driver 50 converts this voltage from an analog signal into a digital signal, and feeds the digital signal into the CPU 48. The CPU 48 processes the signal in time series.

By this processing, the CPU 48 discriminates the sliding direction and speed on the surface of the TPS 37, and moves the position of the cursor 55 in specified direction according to the corresponding direction and speed.

In the conventional MCTE, the user pushes the specified position of the touch panel switch plural times, and moves the cursor to a desired item.

Thus, in the MCTE of the embodiment, the user slides on the surface of the touch panel switch, and moves the cursor to a desired item. By this simple operation of sliding, the user can adjust the position of the cursor 55 to the desired item.

Moreover, as shown in FIG. 1, the outer case 31 has an outer shape of rectangular parallelepiped, and this structure is easy to hold by hand. The user holds the outer case 31, and easily slides the TPS 37, the input selecting means, by the thumb. The shape of the operation part of the TPS 37 is a rectangle longer in the lateral direction of the operation panel of the outer case 31. Generally, the user is easy to move the thumb of the holding hand in the lateral direction of the operation panel of the outer case 31. Hence, the MCTE of the embodiment is very easy to operate by the user.

The user, after adjusting the cursor 55 to the desired item by sliding on the TPS 37, pushes the decision key 36a. By this operation, the CPU 48 receives the signal from the decision key 36a, and recognizes that the desired item has been established. The CPU 48 discriminates the item selected by the cursor 55 of the display unit 33, and calls the corresponding specified menu screen or the like from the ROM 52 or RAM 53. The CPU 48 transmits the called data to the LCD 34 through the LCD driver 49. As a result, the display message of the display unit 33 is changed over to the desired one.

An example of searching and calling a telephone number is explained below.

Figure 7:
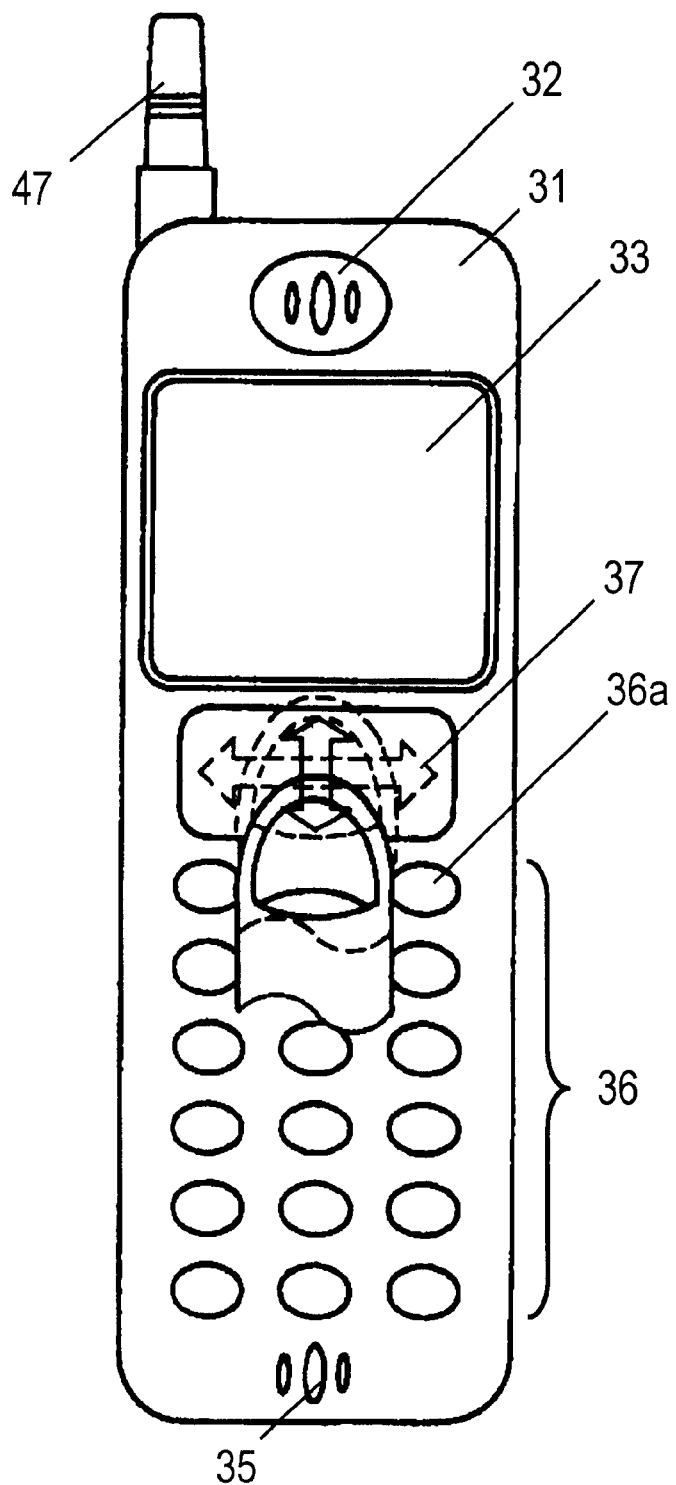
FIG. 7 is a diagram showing the operation state of the MCTE shown in FIG. 1.

The user operates to change over to the display corresponding to the item of "Calling telephone number" from the items of the initial menu 54. for this operation, as shown in FIG. 7, the user slides on the TPS 37 in vertical direction by finger, adjusts the cursor 55 shown in the display unit 33 to the position of the item "Calling telephone number," and pushes the decision key 36a. By this operation, the item of "Calling telephone number" is established.

Once the item of "Calling telephone number" is established, the CPU 48 fetches the information of the registered telephone directory from the RAM 53 or ROM 52. The CPU 48 transmits the information to the LCD 34 through the LCD driver 49. As a result, the display message of the display unit 33 is changed over to the telephone directory. In succession, the user similarly slides on the TPS 37 by finger, and adjusts the cursor position to the desired telephone number, and pushes the decision key 36a. By this operation, the desired telephone number is selected and established. In this way, when the CPU 48 recognizes that the desired telephone number is established, the CPU 48 executes the specified processing. That is, the MCTE transmits a transmission signal to the searched and established telephone number through the transmission-reception circuit 51 and antenna 47, and operates the receiver 32 and transmitter 35 at the same time.

In the MCTE of the embodiment, if there are many items to be selected, only by the simple operation of sliding on the TPS 37 by finger, the position of the cursor 55 can be adjusted to the desired item easily and quickly. In the conventional MCTE, the TTPS 7 must be pushed once every time moving one item. Therefore, as compared with the prior art, the MCTE of the embodiment is excellent in controllability. Further, it is not necessary to dispose the TPS 37 by overlapping on the LCD 34 for composing the display unit 33, and the LCD 34 is reduced in size. In the MCTE of the embodiment, the LCD and touch panel switch are not overlapped. The thickness of the TPS 37 is smaller than that of the LCD. Hence, the MCTE of the embodiment is made thinner than the conventional MCTE. By reduction of size and thickness of the LCD, the MCTE of the embodiment can be manufactured at lower cost. As compared with the conventional MCTE comprising the stick switch or other input device, the surface of the TPS 37 of the embodiment is flat. Hence, the MCTE of the embodiment realizes an excellent dust-proof performance easily.

This explanation is an example of moving the cursor 55 in the vertical direction. In the MCTE of the embodiment, the cursor 55 may be also moved easily in the lateral direction or oblique direction. In this case, too, the same effects are obtained. In the MCTE of the embodiment, if the cursor position is fixed and the item to be selected is moved and selected, the same effects are obtained.

The area of the TPS 37 necessary for this sliding operation is enough if slightly larger than the finger size, and an excellent controllability is maintained.

Figure 8:
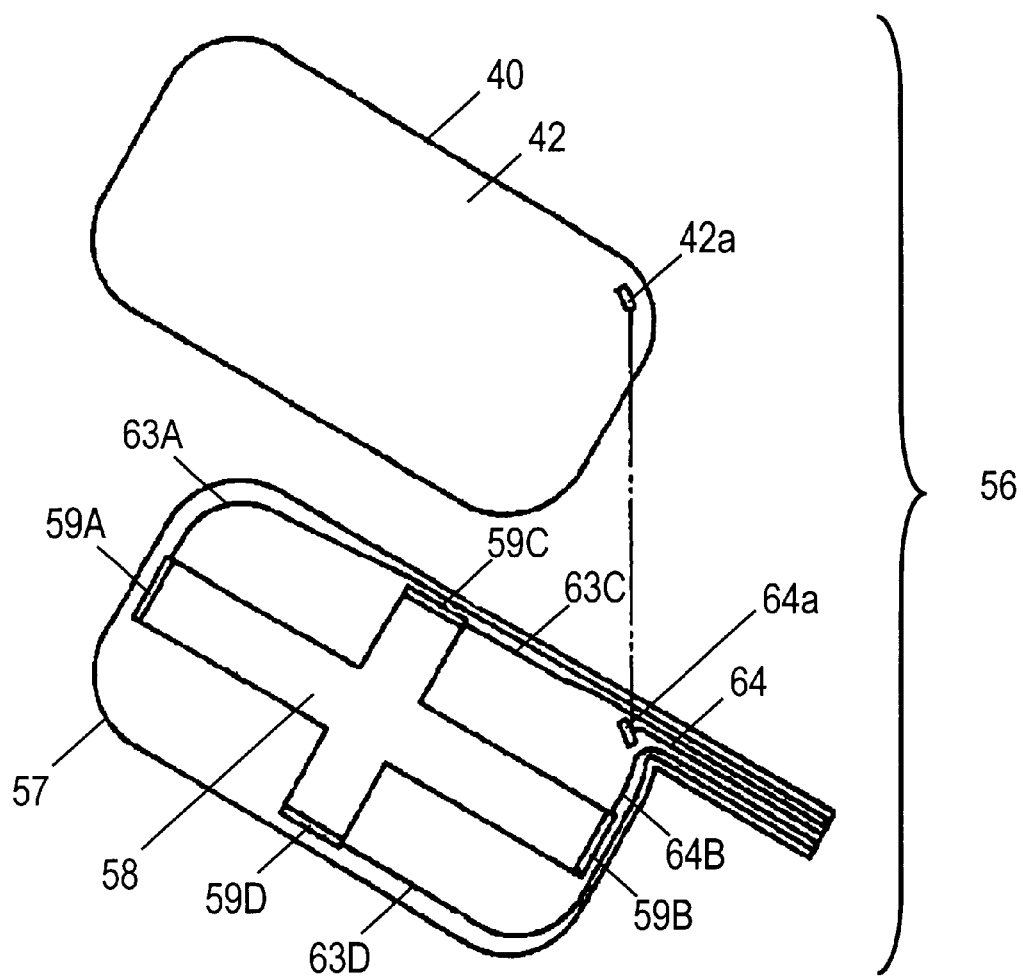
FIG. 8 is a perspective exploded view of other touch panel switch composing the input selecting means of the MCTE shown in FIG. 1.

FIG. 8 shows a perspective exploded view of other structural example of the touch panel switch. As shown in FIG. 8, a conductive film 58 of a LIBM 57 of a TPS 56 is formed in a cross shape corresponding to the width of four electrodes (59A, 59B, 59C, 59D). In this configuration, too, same as in the touch panel switch in FIG. 4, a voltage corresponding to the sliding operation is obtained. On the other hand, for example, the resistance between the electrode 59A and electrode 59B is higher because the width of the conductive film 58 is narrower. Similarly, the resistance between the electrode 59C and electrode 59D is also higher. As the resistance between the electrodes becomes higher, the power consumption can be saved easily. Same as in the TPS 37 shown in FIG. 4, being electrically connected to each one of these four electrodes (59A, 59B, 59C, 59D), derivation parts (63A, 63B, 63C, 63D) in a state electrically insulated from the conductive film 58 are drawn out to outside. A derivation part 64 electrically connected to the conductive film 42 of the UIBM 40 is also provided on the LIBM 57, and drawn out to outside. A leading end 64a of the derivation part 64 is electrically connected to a derivation part 42a of the conductive film 42. However, the derivation part 46 and its leading end 46a are electrically insulated from the conductive film 58.

Figure 9:
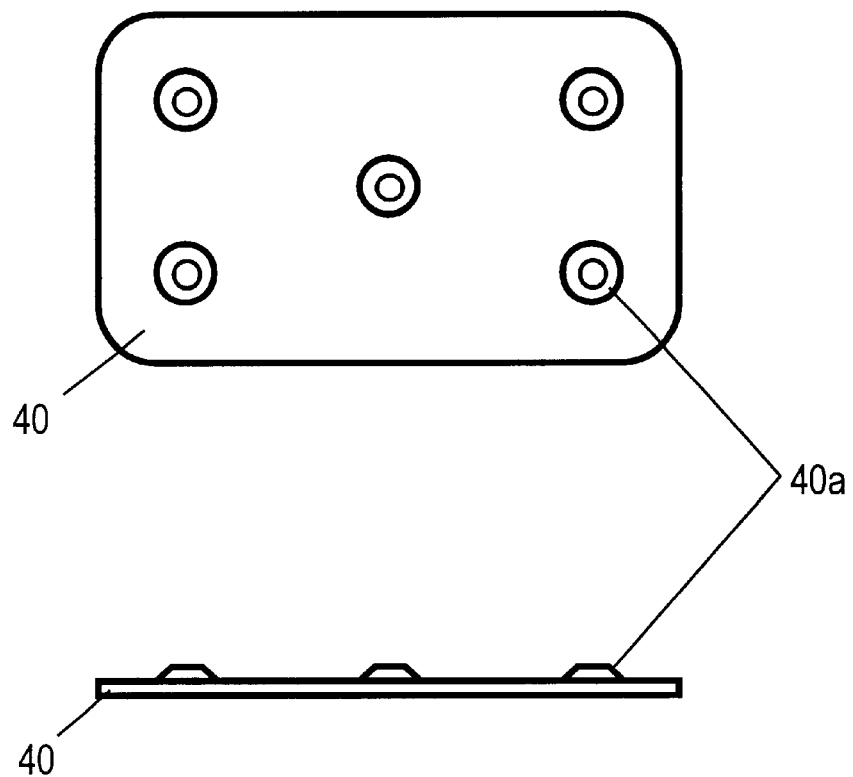
FIG. 9 is a diagram showing an example of forming an operation bump (for example, a dowel) on the surface of the touch panel switch.

FIG. 9 shows an example of forming operation protrusions (for example, dowels) on the surface of the touch panel switch. As shown in FIG. 9, five operation protrusions 40a are formed on the UIBM 40. In sliding operation of the touch panel switch, the finger can be fitted to the operation protrusions. By the feeling by the finger, too, the operating direction can be easily recognized. Instead of visually recognizing the finger position on the touch switch, it can be recognized by feeling.

Further, if a flaw is formed on the surface of the TPS 37, there is no effect on the sliding operation, and excellent operation is maintained for a long period.

In the foregoing example, the decision key 36a is formed as an independent button. However, the "on" information of the TPS 37 may be discriminated by other means.

In this case, to distinguish from the signal issued at the time of sliding operation, two methods may be considered. In a first method, when the cursor comes to the specified position, the user removes the finger from the TPS 37. Next, the user pushes the surface of the TPS 37 twice continuously in a specified time (for example, twice in 200 ms; generally known as doubleclick). When the double-click signal is entered, the CPU 48 judges it as decision signal. Instead of double-click, the switch may be also pressed once, or three times or more. In a second method, when the cursor comes to the specified position, the user keeps pushing the TPS 37 by finger longer than a specified time. When exceeding the specified time, the CPU 48 judges it as decision signal. If the MCTE is designed to deliver a confirmation sound when the CPU 48 recognizes the decision signal, it is easy to understand for the user. By this confirmation sound, it prevents useless pushing of the TPS 37 by the user.

As for the TPS 37, too, the input device such as digital type TTPS or electrostatic capacity type TTPS may be used as the input device of the invention. In any case, it is possible by composing so that the signal obtained by sliding operation is judged by the CPU.

Embodiment 2

Figure 10:
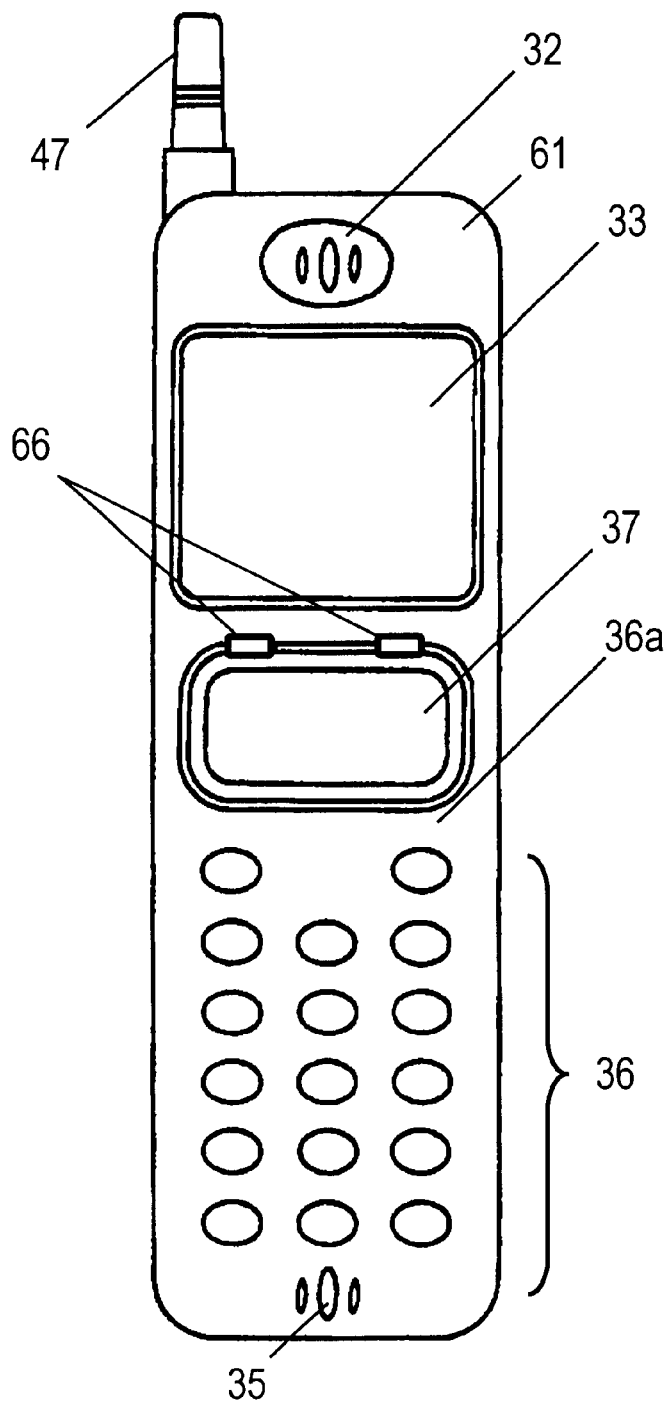
FIG. 10 is a front view of MCTE in a second embodiment of the invention.
Figure 11:
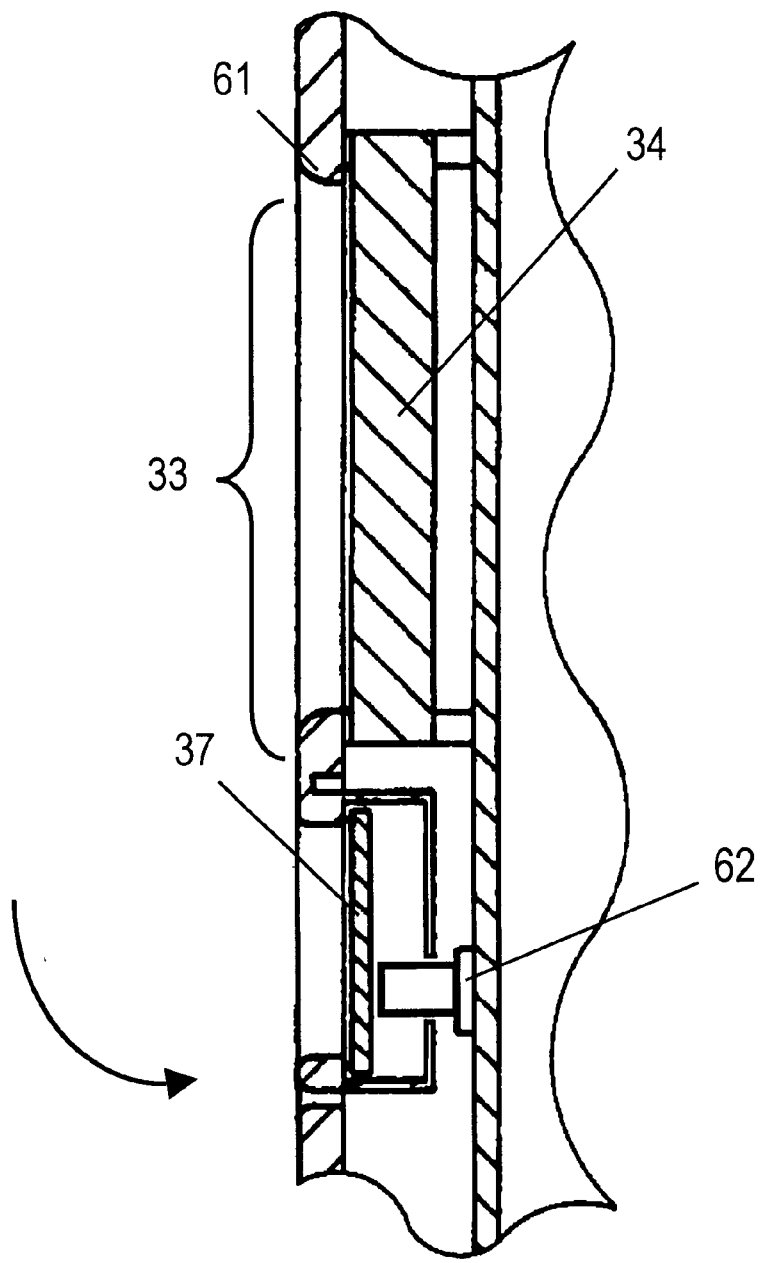
FIG. 11 is a partial sectional view of the MCTE shown in FIG. 10.

FIG. 10 is a front view of the MCTE in embodiment 2 of the invention, and FIG. 11 is a sectional view of display unit 33 and TPS 37 shown in FIG. 10. As shown in FIG. 10, in this embodiment, the TPS 37 is mounted on an outer case 61 through a hinge 66. When the TPS 37 is pressed with a force greater than a specified pressure, it is designed so that the TPS 37 is moved to the inner side of the outer case 61 by a specified distance. A switch 62 pressed and actuated along with the move is provided at the backside of the TPS 37 in the outer case 61 (see FIG. 11).

The other composition is same as in embodiment 1, and its description is omitted.

In embodiment 2, the sliding operation for selecting an item shown in the display unit 33 and the related operation of other parts are same as in embodiment 1, and their explanation is omitted. In this embodiment, when determining the desired item, a specified force is applied to the TPS 37, and the switch 62 provided in the lower part of the TPS 37 is actuated. The signal obtained by this operation is recognized by the CPU (not shown) as decision signal.

In this configuration, the user, after selecting a desired item, continues to press without removing the finger from the surface of the TPS 37. By this operation, the user can establish the desired item. Therefore, this MCTE is further improved in the controllability, and since the decision operation requires a specified pressing force, errors in decision operation are decreased.

Thus, according to the invention, by sliding the touch panel switch provided as input selecting means by finger, the user can easily select a desired item. Therefore, an excellent controllability is assured for a long period and realized at a low cost in the MCTE and the touch panel switch used therein.

Embodiment 3

Figure 12:
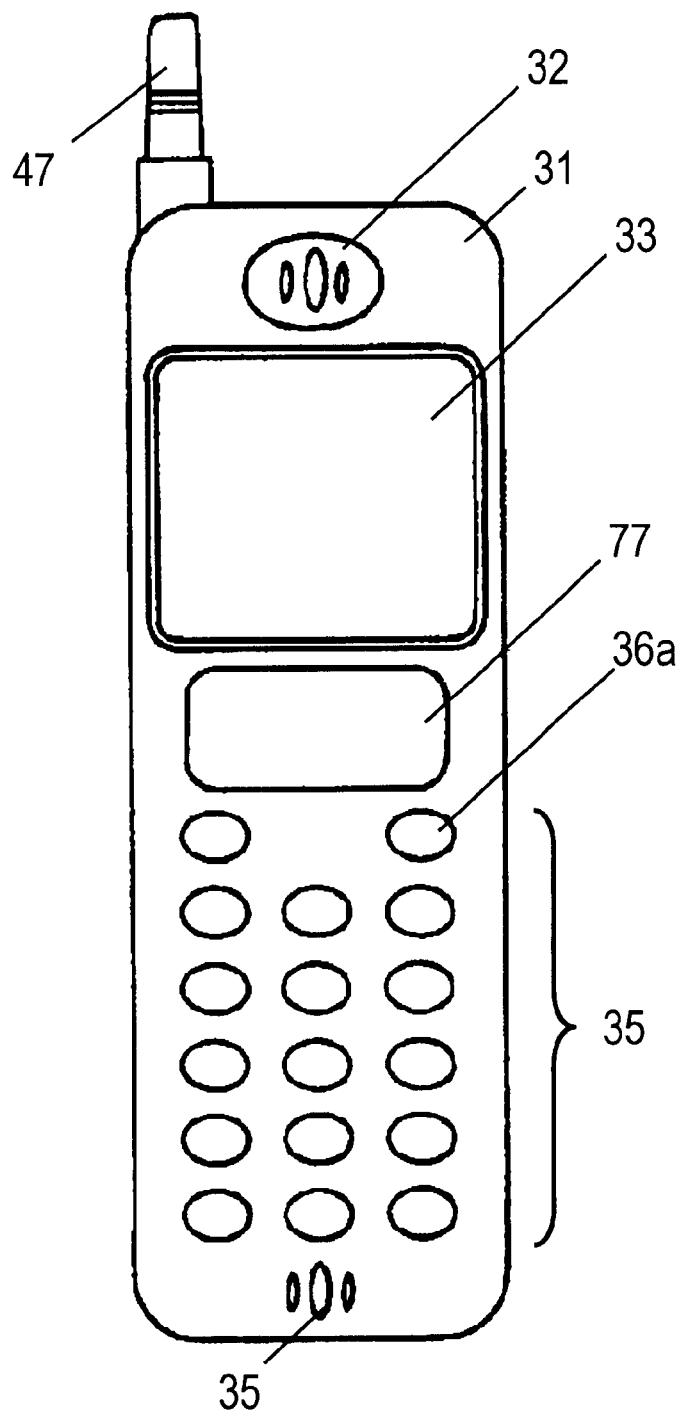
FIG. 12 is a front view of MCTE in a third embodiment of the invention.
Figure 13:
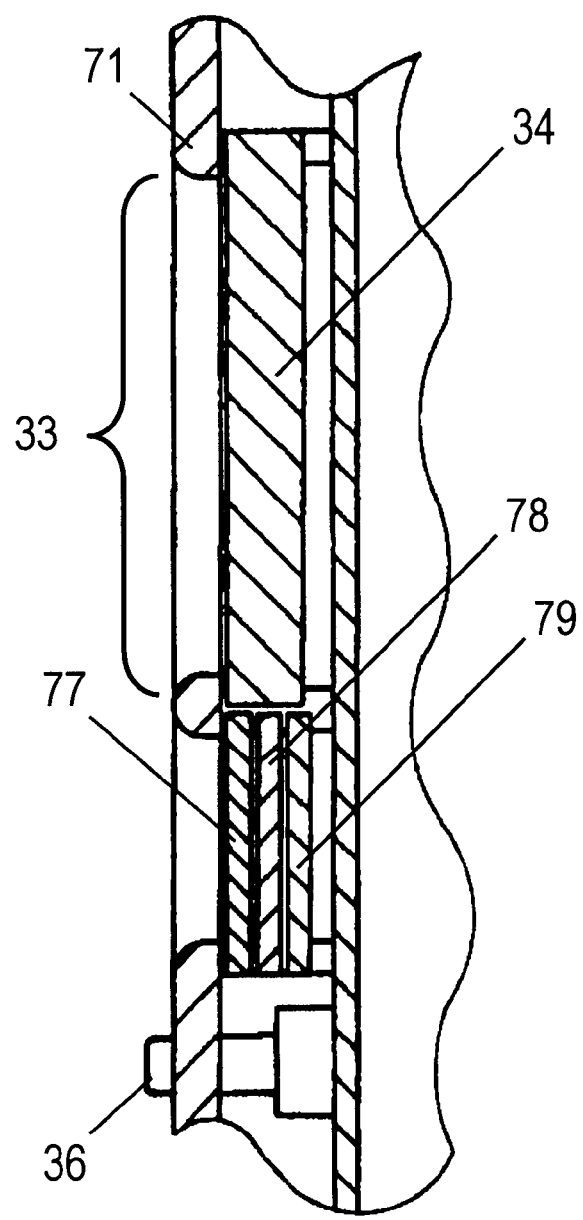
FIG. 13 is a partial sectional view of display unit 33 and touch panel switch shown in FIG. 12.

FIG. 12 is a front view of the MCTE in embodiment 3 of the invention, and FIG. 13 is a partial sectional view of display unit 33 and touch panel switch 77 shown in FIG. 12. The touch panel switch of this embodiment is a transparent touch panel switch (TTPS). As shown in FIG. 13, beneath the TTPS 77 of the embodiment, a half mirror sheet 78 having a half mirror function is disposed, and an EL element 79 is disposed beneath it.

Figure 14:
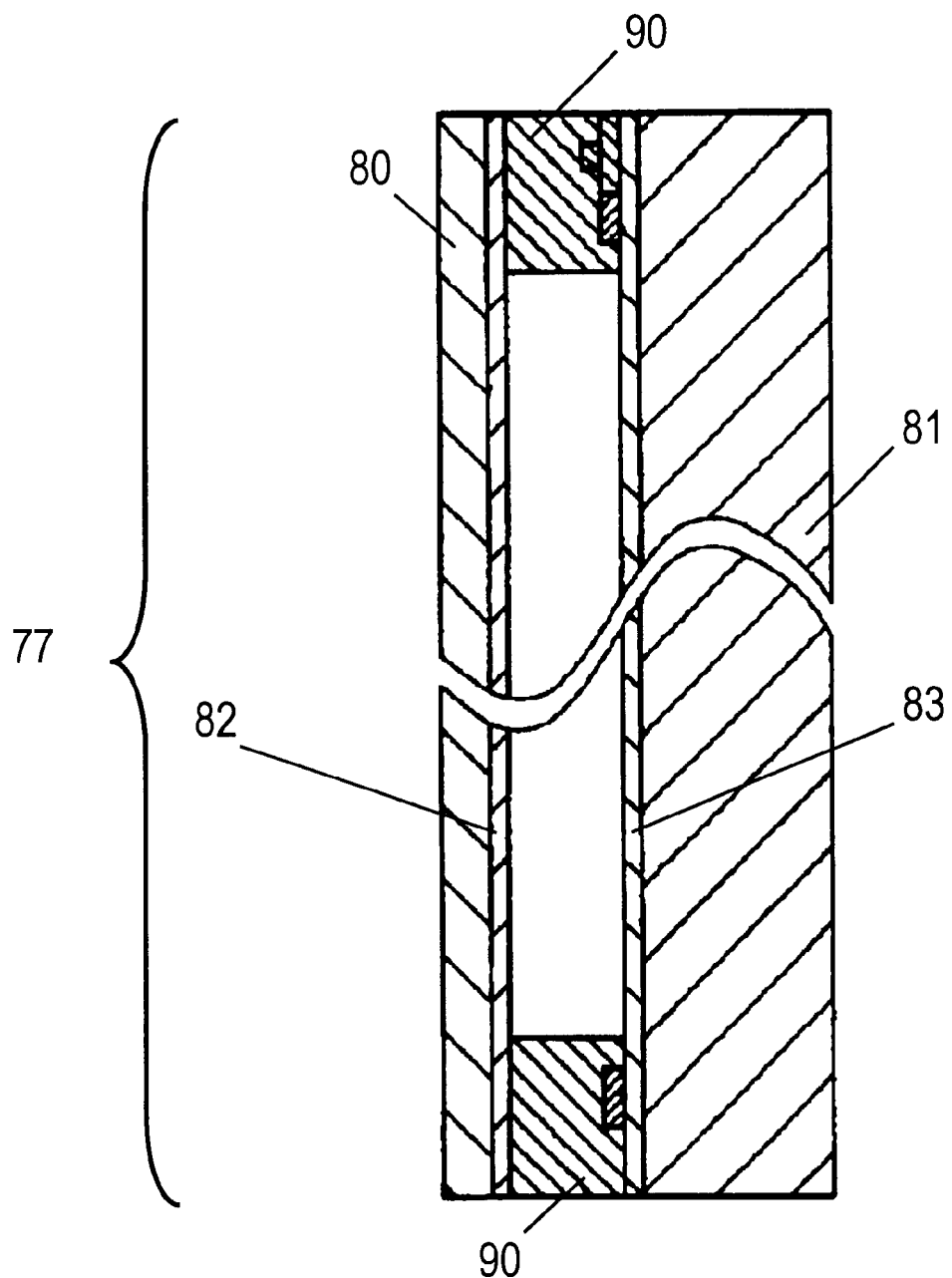
FIG. 14 is a sectional view showing the touch panel switch composing the MCTE shown in FIG. 12.

Further, as shown in a sectional view in FIG. 14, the TTPS 77 is composed of a flexible transparent upper insulating base material (hereinafter referred to simply as TUIBM) 80 forming a transparent conductive film 82 in a specified shape, and a transparent lower insulating base material (hereinafter referred to simply as TLIBM) 81 forming a transparent conductive film 83 in a specified shape, and the conductive films are formed to face each other.

An adhesive layer 90 is to hold the conductive films 82 and 83 at a specific spacing so as to keep in an insulated state.

The other composition is same as in embodiment 1, and its explanation is omitted.

The half mirror sheet sets the direction so as to pass the light from the EL element side, and reflect the light from outside. Usually, the color of the luminescence side of the EL element not emitting light is often original. In this half mirror sheet 78, while the EL element 79 is not emitting light, the original luminescence side color of the EL element 79 can be concealed. While the EL element is illuminating, the half mirror allows to pass the light from the EL element. Therefore, while the EL element 79 is illuminating, its light is passed and the TTPS 77 is illuminated from beneath. As a result, in this composition, the MCTE of a good appearance is obtained.

Instead of forming the half mirror sheet 78 by a separate member, a layer having a half mirror function may be formed on the EL element 79.

Figure 15:
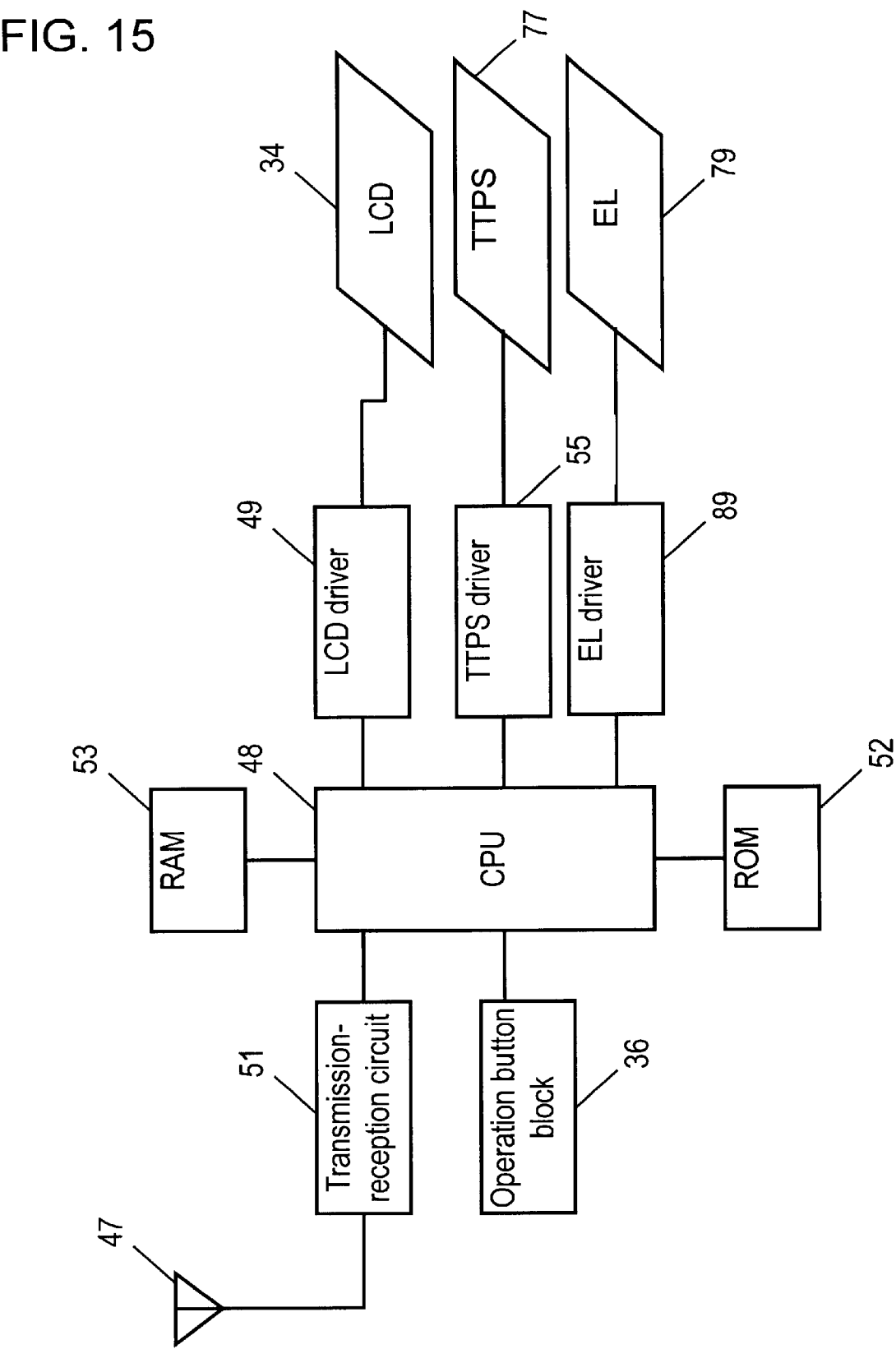
FIG. 15 is a block diagram of the MCTE shown in FIG. 12.

FIG. 15 is a block diagram showing a structure of the MCTE including this electric circuit.

As shown in FIG. 15, the LCD 34 which is the display unit 33, operation button block 36, TTPS 77, EL element 79, and antenna 47 are connected to the CPU 48 directly or through a specified circuit. The CPU 48 processes operations, makes judgement, and controls the LCD 34 which is the display unit 33, operation button block 36, TTPS 77, EL element 79, and antenna 47.

The EL element 79 and antenna 47 are also connected to the CPU 48 through an EL element driver 89 and a transmission-reception circuit 51, respectively.

It is not required to dispose the TTPS 77 by overlapping on the LCD 34 for composing the display unit 33, and the LCD 34 is formed in a small size. The overlapped thickness of the half mirror sheet 78 and EL element 79 is smaller than the thickness of the LCD 34. Hence, the MCTE of the embodiment is thinner than the conventional MCTE. By reduction of size of the LCD and reduction of thickness of the MCTE, the MCTE of the embodiment can be manufactured at lower cost. As compared with the conventional MCTE comprising the stick switch or other input device, the surface of the transparent touch panel switch of the embodiment is flat. Hence, the MCTE of the embodiment realizes an excellent dust-proof performance easily.

The sliding operation for selecting the item shown in the display unit 33 of the embodiment and the operation of the related parts are same as in embodiment 1, and the explanation is omitted.

Further, same as the touch panel shown in FIG. 8 in embodiment 1 of the invention, when the transparent conductive film 83 of embodiment 3 is shaped in a cross form corresponding to the width of the four electrodes, the same effects as in embodiment 1 are obtained.

Moreover, same as the touch panel shown in FIG. 9 in embodiment 1 of the invention, when the transparent operation protrusion is provided on the surface of the transparent touch panel of embodiment 3, the same effects as in embodiment 1 are obtained.

Figure 16:
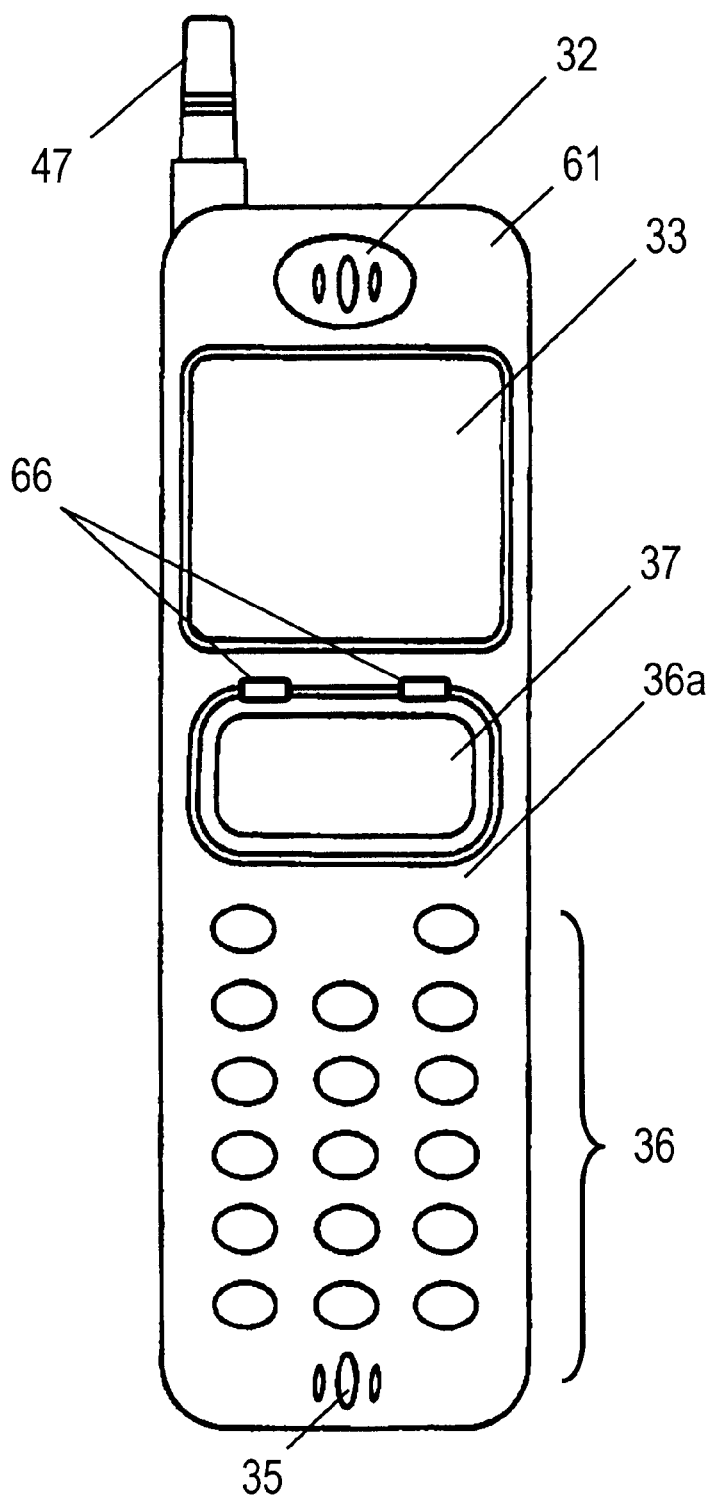
FIG. 16 is a front view of MCTE showing an example of mounting the touch panel switch of the MCTE on an outer case shown in FIG. 12 through a hinge.

Same as in FIG. 10 relating to embodiment 2 of the invention, it is also composed as shown in FIG. 16. That is, as shown in FIG. 16, the transparent touch panel switch 77 of embodiment 3 is mounted on the outer case 61 through a hinge 66. When the TTPS 77 is pressed with a force larger than specified, the TTPS 77 is designed to be moved to the inner side of the outer case 61 by a specified distance. The switch 62 pressed and actuated along with the move is provided at the backside of the TTPS 77 in the outer case 61

Figure 17:
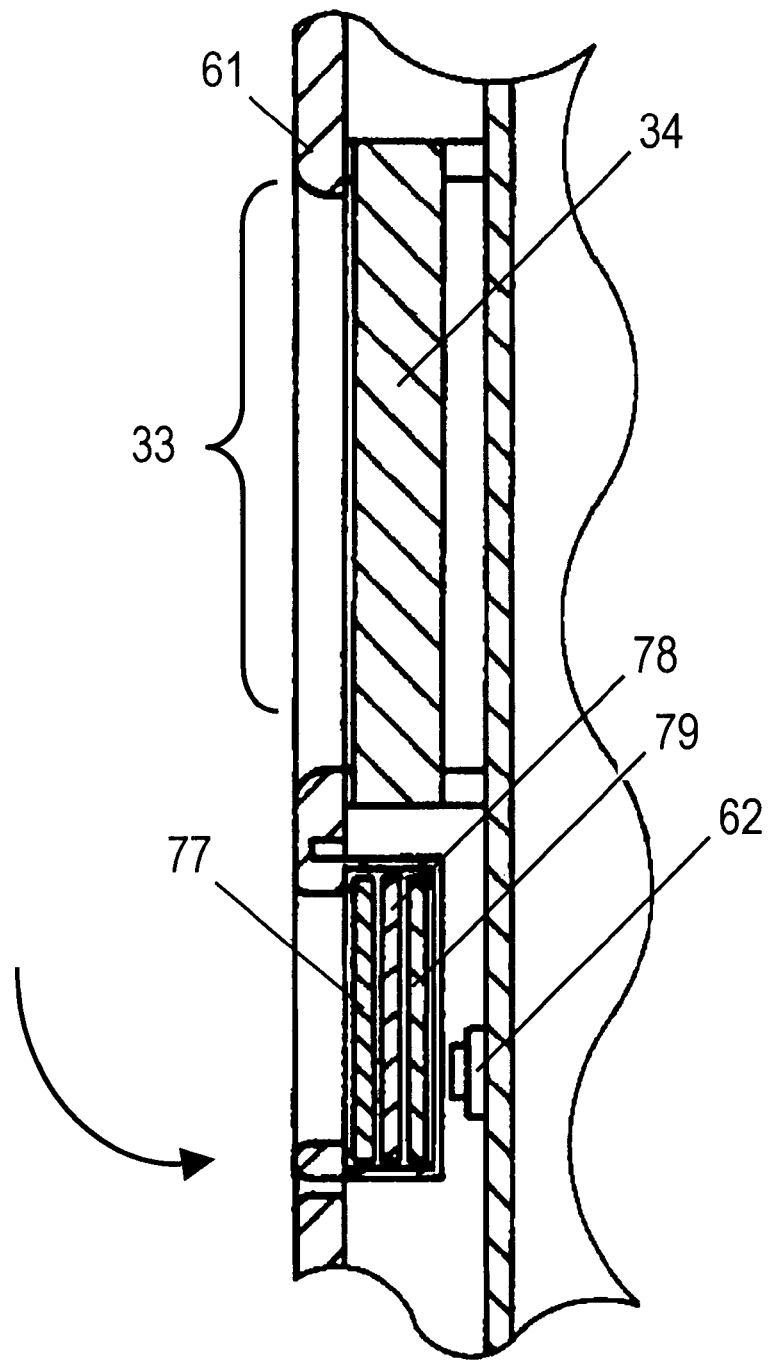
FIG. 17 is a partial sectional view of display unit and touch panel switch shown in FIG. 16.

(see FIG. 17). Thus, the MCTE of embodiment 3 shown in FIG. 16 and FIG. 17 has the same effects as in embodiment 2 of the invention.

In the MCTE of embodiment 3, the EL element 79 is disposed beneath the TTPS 77. In this configuration, the user, if using in the nighttime, can easily recognize the position of the TTPS 77 visually by illumination of the EL element 79.

Figure 18:
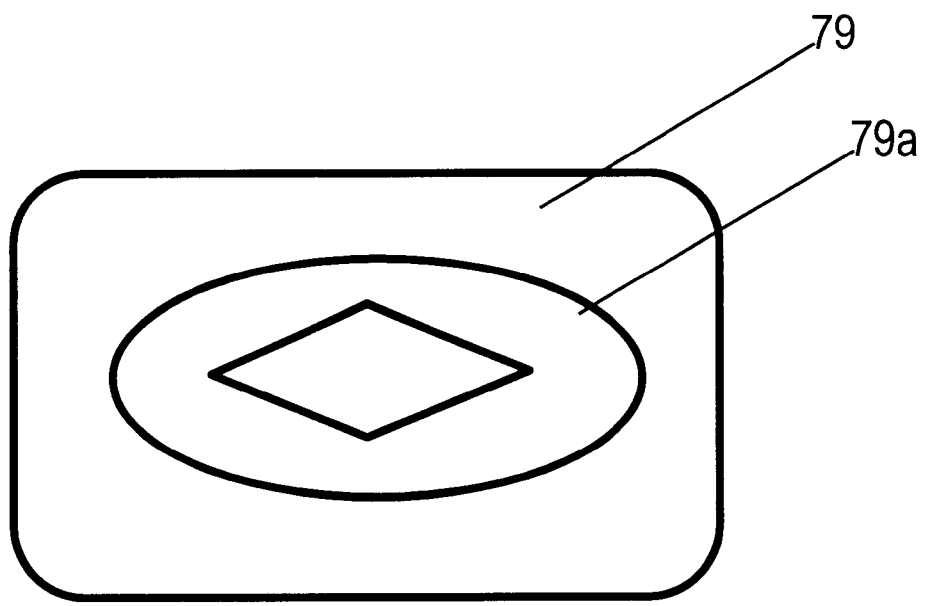
FIG. 18 is a diagram showing an example of display shape of EL of the MCTE shown in FIG. 12.

For example, as shown in FIG. 18, the shape of the illuminating area of the EL element 79 is as shown in 79a. The shape 79a of the illuminating area of the EL element 79 may include the graphic, pattern, character, logo, and illustration, among others. Owing to the shape 79a of the illuminating area, in addition to the above effects, the MCTE of embodiment 3 is excellent in appearance.

Thus, according to the invention, by sliding the transparent touch panel switch disposed as input selecting means by finger, the user can select a desired item easily. Therefore, in the MCTE and the transparent touch panel switch used therein, the excellent controllability can be assured for a long period and realized at low cost.

What is claimed is:

1. A mobile communication unit, comprising:
   a) a display unit which displays a plurality of items and which indicates which of said plurality of items are selected;
   b) a plurality of keys for entering operation data, which relates to operation of said mobile communication unit, into said mobile communication unit;
   c) a transmitter for transmitting and receiving signals in accordance with said operation data and said plurality of items which are selected; and
   d) a touch panel which controls changing of indication of said plurality of items on said display unit, in different directions of said displayunit, responsive to sliding along said touch panel in respective directions;
       wherein said display unit, said plurality of keys, said transmitter and said touch panel are integrated into a single unit.

2. A mobile communication unit according to claim 1, wherein the touch panel is larger from side to side than from top to bottom.

3. A mobile communication unit according to claim 1, wherein any one of said plurality of items is selected by pressing said touch panel by a specified number of times after said any one of said plurality of items is indicated.

4. A mobile communication unit according to claim 1, wherein any one of said plurality of items is selected by pressing said touch panel continuously after said any one of said plurality of items is indicated.

5. A mobile communication unit according to claim 4, wherein a sound is generated responsive to said touch panel being continuously pressed for a predetermined duration.

6. A mobile communication unit according to claim 1, wherein a switch is situated beneath said touch panel and one of said plurality of items is selected responsive to said switch emitting a signal when said touch panel is depressed causing said switch in turn to be depressed.

7. A mobile communication unit according to claim 1, wherein a plurality of protrusions are formed on a surface of said touch panel.

8. A mobile communication unit according to claim 1, wherein said touch panel is transparent.

9. A mobile communication unit according to claim 8, wherein an EL element is overlapped and disposed beneath said touch panel.

10. A mobile communication unit according to claim 9, wherein said EL element has a light emitting area in a specified shape.

11. A mobile communication unit according to claim 9, wherein partial reflectance occurs above said EL element.

12. A touch panel for use in a mobile unit, said mobile unit including:
    a display unit which displays a plurality of items and which indicates which of said plurality of items are selected;
    a plurality of keys for entering operation data, which relates to operation of said mobile communication unit, into said mobile communication unit;
    a transmitter for transmitting and receiving signals in accordance with said operation data and said plurality items which are selected; and
    said touch panel, wherein said touch panel controls changing of indication of said plurality of items on said display unit, in different directions of said display unit, responsive to sliding along said touch panel in respective directions, said touch panel comprising:
        a flexible upper insulating base material and a lower insulating based material each formed of conductive film which are held at a spacing so that the conductive film sides face each other, and
        a plurality of electrodes provided at four positions mutually orthogonal on the conductive film of the lower insulating based material.

13. A touch panel according to claim 12, wherein the conductive film of said lower insulating based material is shaped in a cross form corresponding to the length of the electrodes.

* * * * *